United States Patent [19]

Suwanda et al.

[11] Patent Number: 5,505,900
[45] Date of Patent: Apr. 9, 1996

[54] CONTINUOUS PROCESS FOR MANUFACTURE OF CROSSLINKED, ORIENTED POLYETHYLENE EXTRUDATES

[76] Inventors: Dedo Suwanda, 59 Falcon Street, Toronto, Ontario, Canada, M4S 2P4; Stephen T. Balke, 2043 Jackamar Court, Mississauga, Ontario, Canada, L5L 3P7; Xue L. He, 35 Charles Street West Apt. 1406, Toronto, Ontario, Canada, M4Y 1R6

[21] Appl. No.: 272,548

[22] Filed: Jul. 11, 1994

[51] Int. Cl.$^6$ .................................................. B29C 35/10
[52] U.S. Cl. .................. 264/477; 264/210.7; 264/288.4; 264/331.17; 264/495
[58] Field of Search .................. 264/22, 210.2, 264/210.7, 288.4, 331.17, 477, 495

[56] References Cited

U.S. PATENT DOCUMENTS

| | | | |
|---|---|---|---|
| 3,651,196 | 3/1972 | Starkweather, Jr. | 264/210.2 |
| 4,545,950 | 10/1985 | Motooka et al. | 264/331.17 |
| 4,778,633 | 10/1988 | Kiang et al. | 264/22 |
| 4,870,136 | 9/1989 | Yagi et al. | 264/210.2 |
| 4,888,141 | 12/1989 | Bastiaansen et al. | 264/331.17 |
| 5,055,248 | 10/1991 | Motooka et al. | 264/210.7 |
| 5,234,652 | 8/1993 | Woodhams et al. | 264/210.2 |
| 5,256,358 | 10/1993 | Shiraki et al. | 264/210.7 |
| 5,399,308 | 3/1995 | Woodhams et al. | 264/210.2 |

FOREIGN PATENT DOCUMENTS

| | | | |
|---|---|---|---|
| 60-194109 | 10/1985 | Japan | 264/210.7 |
| 5-140816 | 6/1993 | Japan | 264/210.7 |

OTHER PUBLICATIONS

Oing and Ranby, "Photoinitiated Crosslinking of Low Density Polyethylene". Polymer Engineering & Science, Jun. 1992. Vol. 32, No. 12, pp. 831–835.

Chen and Ranby, "Photocrosslinking of Ultrla High Strength Polyethylene Fibers", Polymers for Advanced Technolgies, vol. 1 pp. 103–107.

Oing & Ranby, "Photoinitiated Crosslinking of Low Density Polytheylene". Polymer Engineering & Science, Oct. 1992 vol. 32, No. 19, pp. 1433–1439.

*Primary Examiner*—Jeffery R. Thurlow
*Attorney, Agent, or Firm*—Ridout & Maybee

[57] ABSTRACT

High molecular weight polyethylene products of high strength, good thermal resistance and creep resistance process in which the polyethylene is melt drawn in a multiple-stage drawing process in which the polyethylene extrudate is treated sequentially by a first drawing process which uses an elongating draw at an elongation strain rate of from about 0.03 to 0.5 $S^{-1}$, a subsequent stage of elongating draw at a lower elongational strain rate, whilst subjecting the extruded polyethylene to UV crosslinking during the subsequent stage of elongating draw at lower elongational strain rate.

11 Claims, 11 Drawing Sheets

CONTINUOUS PROCESS FOR MANUFACTURE OF CROSSLINKED, ORIENTED POLYETHYLENE EXTRUDATES

FIELD OF THE INVENTION

This invention relates to polyethylene products and processes for their production. More particularly, it relates to highly oriented and crosslinked polyethylene products of very high strength and modulus, increased creep resistance and improved thermal resistance, and to processes for producing such products in a commercially acceptable and economical manner.

BACKGROUND OF THE INVENTION

A significant amount of research has been conducted on processes for the orientation of polyethylene molecules, for purposes of increasing the strength of the products manufactured therefrom. It is known that the covalent carbon-carbon bond is one of the strongest of all chemical bonds. Theoretical elastic modulus and strength along the chain of the polyethylene molecule reaches values as high as 300 and 10 GPa respectively. In practice, however, it is very difficult to manufacture a product having even 10% of the theoretical strength and modulus, at least in an economically attractive, commercial process.

Orientation of polyethylene molecules can be pictured as an alignment of the molecules, so as to be disposed with the axes of their main chains generally parallel to one another, in the mass of the polymer. Such orientation causes quite dramatic increases in the mechanical strength properties of the polymer as is well known.

Polyethylene products in general are subject to "creep," i.e. they gradually elongate under stress over time due to the chain extension and slippage of the molecules. This is particularly troublesome in applications such as racquet strings and binding strapping, where a slackening of the tension imparted on application can render them useless, and in applications where they are to be bonded to other plastics of different physical characteristics.

Though increase of orientation results in a great improvement of creep resistance, highly oriented polyethylene products still show sufficient creep to cause major problem in load bearing applications. Previous studies have indicated that crosslinking improved the creep resistance and the thermal resistance of oriented and unoriented polyethylene.

BRIEF REFERENCE TO THE PRIOR ART

A combination of molecular orientation and crosslinking of polyethylene has been explored previously, as a means of obtaining high strength, lower creep and high thermal resistance polyethylene products. The challenge of this combination is how to crosslink a polyethylene sample without either reducing its obtainable orientation (attainable draw ratio) or weakening the imparted strength of the products. There are three primary candidate methods for accomplishing this task. The first method is hi-energy radiation (usually either $\gamma$ radiation or electron beam). In addition to crosslinking, both $\gamma$ and other types of high energy radiation induce a great extent of main-chain scission which inevitably reduces the strength of the products. The second method is chemical crosslinking by using a peroxide (typically dicumyl peroxide). However, if the peroxide decomposes during extrusion it will form a cross-linked network which dramatically reduces the maximum attainable draw ratio. The alternative of arranging the process so that peroxide decomposition follows drawing would require temperatures which would destroy of the orientation. The third method employs ultraviolet light to irradiate a mixture of polyethylene and UV sensitizer to form a cross-linked network. It has been shown that this third method is the preferred one for crosslinking oriented polyethylene.

Ranby et. al., "Polym. Eng. & Sci.," June 1992, Vol.32, No. 12, reported a method of crosslinking involving UV sensitive reactants. A mixture of polyethylene, crosslinker e.g. a functional monomer, and UV sensitizer (photo initiator) was UV irradiated to produce a crosslinked polyethylene network. This mixture is unreactive until exposed to UV radiation. Even temperatures as high as 200° C., (a temperature higher than normal extrusion temperature) will not initiate crosslinking without UV radiation.

Ranby, "Polym. Adv. Tech.", vol.1, pp 103–107 (1990) reported an attempt to crosslink oriented polyethylene fibres by immersing the fibres in solution containing crosslinker and UV sensitizer for hours, and then UV irradiating the fibres. This process is tedious because of the large amounts of solvent used. It is also very slow, and limited to the use of thin films or fibres because of the solvent diffusion problems. It is not commercially feasible.

Ranby et.al., "Polym. Eng. Sci.," vol. 32 pp 1433–1438 (1992) also reported an attempt to orient and crosslink low density polyethylene (LDPE). The LDPE exhibited a $M_w$ of 140,000 and contained both UV sensitizer and crosslinking agent. In this process, a maximum draw ratio of four was achieved. The tensile strength increased to values of less than twice the original strength. It was found that the tensile strength reached a maximum value (which was less than twice of the original value) at the draw ratio of 2–3. At higher draw ratios, the tensile strength was lower than the maximum value.

SUMMARY OF THE INVENTION

It is an object of the present invention to provide a novel process for preparing highly oriented and crosslinked polyethylene products with high strength, low creep, and improved thermal resistance properties.

It is a further object to provide such a process which can be operated economically on a commercial scale.

In the present invention, polyethylene products of high strength and improved thermal resistance and creep resistance are produced by a multiple-stage drawing process in which the polyethylene extrudate is treated sequentially by three basic (functional) processes as follow:

(1): Multiple-drawing Process

Extrudate is first drawn to a very high draw ratio, preferably close to its maximum attainable draw ratio by a multiple-stage drawing process. In this process the elongational strain rates in the each stage are specially designed so that the desired, very high draw ratio can be achieved economically at a commercial scale.

(2): Simultaneous UV Crosslinking and Orientation Process

Extrudate which has achieved its very high orientation by the multiple-stage drawing process above is then UV irradiated under a reasonably high tension. The elongational strain rate in this stage is so designed that imparted orientation in the previous stages will not be lost and an advantageous balance between crosslink efficiency and a further increase of orientation is achieved.

(3): Post UV Drawing and Annealing Process

Highly oriented and crosslinked extrudate then passed through a final drawing and annealing process further to improve the properties of the products. The elongational strain rate, temperature, draw ratio, and annealing time are selected according to the specific application of the products and to the upstream drawing-cross-linking accomplished.

The process of the present invention, which combine the three basic processes listed above, is actually an integration of four different concepts: (1) multiple-stage drawing with elongational strain rates specified so as to accomplish a very high, preferably close to the maximum attainable draw ratio at a economical scale; (2) crosslinking the product only after it has achieved its very high degree of orientation to guard against impairment of the orientation mechanism by crosslinking; (3) utilizing UV irradiation to crosslink the polyethylene extrudate under tension so that tensile properties will not decrease (and may even improve) after crosslinking; (4) employing a post-UV drawing and annealing process to further improve or adjust the properties of the products as necessary.

In experimental work leading to the present invention, it has been determined that the maximum draw ratio which can be reached for a given polymer under given drawing conditions is dependent upon the elongational strain rate at which the polymer is drawn. The elongational strain rate "G" may be defined as the ratio of the change in velocity of the draw of the polymer as it is elongated, to the change in length of the polymer sample as it is so drawn to orient it. When a polymer sample is drawn between two gripping rollers located at a fixed distance apart and rotating at different speed in the same directions, as is common in industrial polymer drawing processes, there is no change in G, since there is no change in length 1 and no change in velocity v. "Draw ratio" is defined as the ratio of original cross-sectional area of the sample to final cross-sectional area, after drawing. The faster the sample is drawn, the smaller the draw ratio at which it breaks. Since higher draw ratios lead to greater degrees of orientation and hence greater strength properties, low draw speeds, i.e. low elongational strain rates G should be adopted. To achieve this in a conventional drawing system, however, means adopting very slow draw rates and/or very long initial lengths of sample to be drawn, both of which factors are uneconomic on a manufacturing scale.

The present invention overcomes this problem by adopting a multiple stage drawing process. In the initial stage, the polymer sample is drawn relatively rapidly, at an elongational strain rate in the approximate range 0.03 to 0.1 $S^{-1}$, so as to achieve rapidly a draw ratio of up to about 75% of that required in the final product to confer the desired strength properties thereon. Appropriately, this is a draw ratio of from about 5–8. At least the final 10% to 25% of the draw ratio, appropriately a draw ratio of from about 1.1 to 2.5, is imparted to the sample by drawing at a much lower elongational strain rate G, i.e. in the approximate range 0.001 to 0.01 $S^{-1}$. By operating in this manner, very high draw ratios can be achieved, with consequent high strength properties in the polyethylene, without breaking the samples in the drawing process. Significant product advantages are obtained without subjecting the material to UV crosslinking, i.e. just by using the multiple stage drawing and orientation as defined.

DESCRIPTION OF THE PREFERRED EMBODIMENTS

Figure 1:
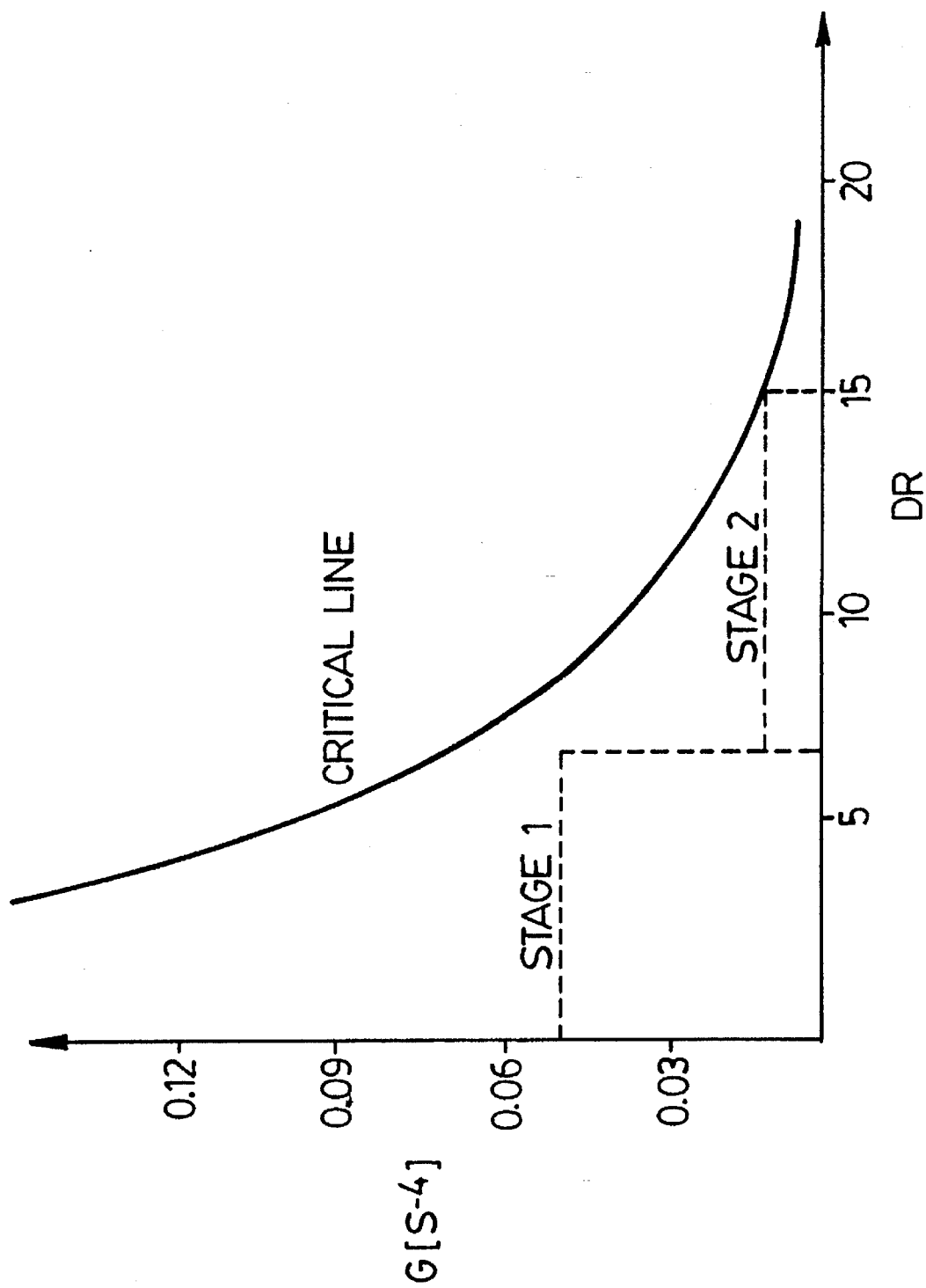
FIG. 1 is an experimentally derived plot of draw ratio at break against elongational strain rate, derived from the results from Example 1 below.

The process of the present invention involves orientation of the polyethylene mixture in at least two stages, and preferably more than two stages, at different draw ratios and strain rate. The strain rate and other conditions of the drawing elongation in all stages are preferably controlled to follow the natural drawing behaviour of the polymer. The strain rate, temperature of extrudate and drawing, and the properties of the polyethylene being drawn are all factors in achieving a successful drawing process in which the mechanical properties increase with the draw ratio and in which high draw ratio can be achieved. Temperature is preferably so selected that the molecules are relatively free to be aligned, but also so that "freezing" of the orientation can be achieved quickly. Such temperatures are suitably from about 10° C.–40° C. above the softening point of the polyethylene. In general, the higher the molecular weight of the polyethylene, the more rapid is the increase of mechanical properties of the product with draw ratio. The process of the invention is applicable to all polyethylenes of weight average molecular weight from about 200,000 and higher.

FIG. 1 of the accompanying drawings is a plot of draw rate DR against strain rate G for polyethylene samples drawn by method in which the polyethylene sample is held between rolls located a fixed distance apart, and rotated in the same directions at controlled different speeds to effect the drawing. It shows the critical line 10, i.e. the draw ratios at which the polymer will break under a particular strain rate. It shows that, as the strain rate decreases, the achievable draw ratio increases. Use of a low strain rate G throughout the process is uneconomic and impractical. The performance of the process using standard equipment such as godets, pullers and ovens, with a continuously decreasing G value, is very difficult to achieve in practice. Accordingly, the process of the invention uses at least two distinct stages of drawing, in the first stage 12 of which high G values are used, and in a subsequent stage such as 14, in the preferred embodiment, progressively decreasing G values are used. The appropriate values for use in practice are conveniently determined by use of a curve such as that shown in FIG. 1, care being taken in all cases to select G values which do not exceed the continuous, critical line 10.

Preferably, the crosslinking is achieved by UV irradiating the oriented polyethylene material containing crosslinking agents, namely UV sensitizer, and crosslinker (if necessary), while the material is being subjected, in the preferred process, to a stretching operation. In the process of the invention, the polyethylene sample is crosslinked only after it has achieved a very high, close to its maximum attainable, orientation.

Preferably, the UV irradiation is applied during a later, low strain rate drawing process. The presence of tension during irradiation helps prevent loss of orientation by UV heating and further enhances creep resistance. The strain rate at this stage is much lower than the one in the first drawing stage and is set so as to balance effectiveness of the cross-linking process with desirable orientation consequences.

Significant decreases in creep and stress relaxation rates are achieved, while retaining and even increasing the tensile properties of the products. Resistance to creep at elevated temperatures, i.e. thermal resistance, is affected primarily by the amount of crosslinking accomplished, the maximum crosslinking provides the maximum thermal resistance.

A UV sensitizer, to initiate crosslinking by generation of free radicals in the polyethylene extrudate, is incorporated into the extrudate by either mixing with polyethylene before extrusion, or directly adding to extruder feed. The concentration of the UV sensitizer can range from 0.3% to 3.0% in weight, preferably from 0.5% to 1.5%. The mixture can be extruded, orientated, and highly crosslinked by UV irradiation. The choice of UV sensitizer is within the skill of the art. It should be compatible with polyethylene. Benzophenone is a suitable choice. More preferred are benzophenone derivatives with higher vapour pressure.

If the sample to be UV irradiated is thicker than 1 millimeter or the UV irradiation time is less than 10 seconds, a crosslinker can be added to the mixture of the polyethylene and UV sensitizer to enhance the crosslink reaction. An example of a suitable crosslinker is 2,4,6-triallyloxy-1,3,5-triazine (triallyl cyanurate). By adding this crosslinker, the efficiency of the crosslinking reactions at early stage (when UV irradiation time is less than 10 seconds) and the homogeneity of the crosslinking achieved in a thick sample are greatly improved. The concentration of the crosslinker is suitably in a range from 0.3% to 1.5%, preferably from 0.5% to 1.0%.

The irradiation time needed to form an effective crosslink network and ensure most of the UV sensitizer in the sample has been reacted depends on the thickness of the sample, the concentration of the UV sensitizer, the power of the UV source, and the temperature of irradiation. It will range from 5 to 20 seconds, or more precisely, from 7 to 15 seconds in the examples provided here.

The UV irradiation temperature is controlled at a relatively high value consistent with other factors. The sample must not be broken, nor its orientation impaired. The higher the temperature during the UV irradiation process, the higher the efficiency of the crosslinking reaction. In the off-line UV irradiation process, the samples may need to be warmed before entering the UV chamber so that the crosslinking reaction is speeded up. In most case, however, it is necessary to cool the irradiation channel by forcing air or nitrogen gas through it to prevent the sample's melting during the UV irradiation process. There is no significant difference between using air or using nitrogen as a cooling agent in terms of the crosslink efficiency or the gel content. Preferably, air is used for economic reasons.

A UV filter (usually a type of glass which cuts off UV light in a specified range of shorter wave lengths) can be employed if overheating or degradation of the sample is of concern. Preferably, a PYREX or VYCOR glass is used.

For best results, the system should be thermally stable. The crosslinker molecules are stable as long as there are no free radicals in their proximity. The UV sensitizer will not produce free radicals except on exposure to UV irradiation. However, processing at high temperature, with high shear rates and in the presence of oxygen in the extruder, may create free radicals and result in some degree of crosslinking. It is preferred, according to this invention, to arrange the process conditions so that any such crosslinking is minimized and the drawability of the extrudate thus unaffected.

It is also preferred to include lubricant in the system when processing ultra-high molecular weight polyethylene, (UHMWPE), either by pre-blending with the mixture prior to extrusion, or by injecting lubricant into the polymer-metal interface at the entrance to the extrusion die. Lubricant serves to produce smooth extrudates. Surface defects reduce the drawability of the extrudate. The lubricants are selected so as to avoid affecting the crosslinking reaction while maintaining a high lubricating efficiency. Crodamide ER (powder) lubricant is preferred for mixing with the polyethylene for lubrication. For direct lubricant injection, liquid lubricants such as silicone oil or glycerine are preferred.

The polyethylenes used in the process of the present invention are preferably high molecular weight polyethylenes, especially ultra high molecular weight polyethylenes, and high molecular weight high density polyethylenes.

As a result of this preferred process, there are produced, in an economic and commercially feasible manner, oriented, crosslinked polyethylene products of very high strength and modulus, as well as high creep resistance and improved thermal stability. The process is simple and economical to operate, on a continuous or semi-continuous basis, to produce products such as strings, fibres, films, straps, and sheets.

Figure 2:
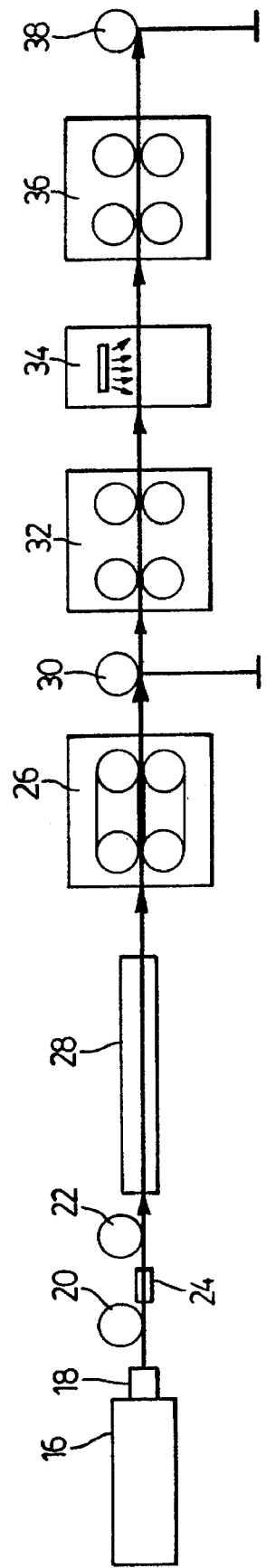
FIG. 2 is a diagrammatic flow sheet of one preferred process (off-line mode) according to the present invention.
Figure 3:
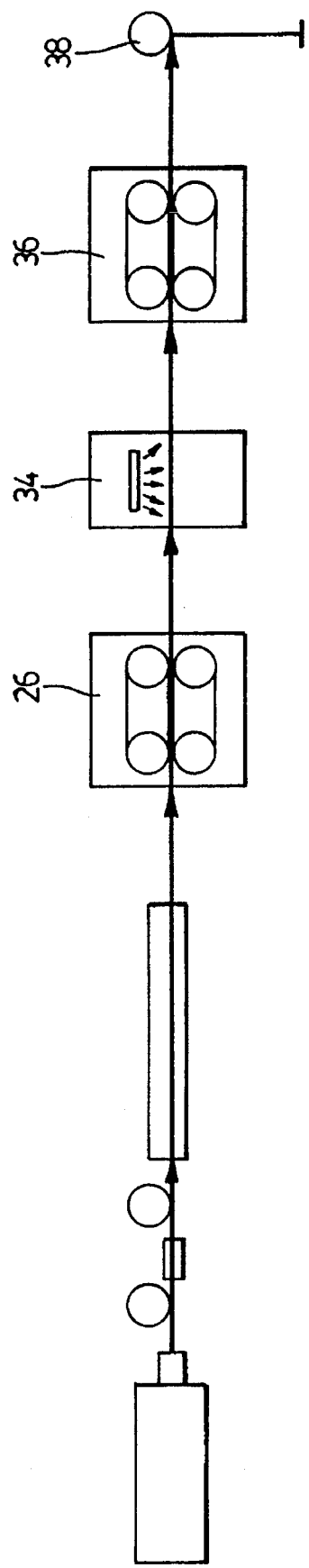
FIG. 3 is a similar illustration to FIG. 2, but showing an alternative preferred process (on-line mode)

FIGS. 2 and 3 of the accompanying drawings are schematic diagrams of two different alternative set ups for the combined orientation-crosslinking process according to the preferred embodiments of the present invention. In FIG. 2, the process is one of orientation and off-line UV irradiation. In FIG. 3, the process is one of orientation and on-line UV irradiation.

With reference to FIG. 2, this orientation process (Section A) and off-line UV irradiation process (Section B) includes an extruder 16 from which the molten polyethylene mixed with UV sensitizer, crosslinker and lubricant as appropriate is extruded through die 18. The extruder 16 is a single screw extruder, equipped with heaters along the barrel thereof to arrange for appropriate temperatures along the extruder barrel. The die 18 comprises a transition adaptor, a streamline die. The adaptor serves as a buffer zone to eliminate the flow disturbances, especially the rotating motion resulting from the screw motion. It also serves as a temperature buffer zone, which helps to moderate temperature fluctuations and temperature uniformity.

After leaving the die 18, the extrudate is oriented between two heated godets 20, 24 in the first drawing stage. The first godet 20 picks up the extrudate at the same speed as the speed of extrudate leaving the die 18. Very little or no tension is applied between the die 18 and the first godet 20. The second godet 24 is operated at much higher speed, to set the draw ratio in the first stage. The centres of the godets are approximately 0.6 meters apart. A heated pipe 22 is used as an oven between the godets to maintain the temperature of the polymer at the predetermined level. The elongated strain rate in the first stage is the ratio of the speed difference between the godets 20, 24 and the distance between the centres of the godets. For example, if the speeds of the godets are 0.3 and 2.1 meters per minute, the elongational strain rate G and the draw ratio DR in the first stage are 3.0 per minute (0.05 per second) and 7, respectively. The second drawing stage takes place between the second godet 24 and a belt puller 28. The drawing temperature in the second stage is controlled by a forced air convective oven 26. The distance between the godet 24 and the puller 28 and the speed of the operation determines the draw ratio and the strain rate in the second drawing stage. The product from the orientation process is wound up by a winder 30.

In the irradiation stage B, the extruded, oriented material from a spool 32 is then crosslinked under tension by exposing it to UV irradiation. The extrudate is pulled off the spool 32 by the first puller 34 of the irradiation step, shown in the lower portion of FIG. 2. The extrudate then passes a hot pipe 36, and then enters the UV irradiator 38 located between the first puller 34 and the second puller 40, between which the orientation and the crosslink are occur simultaneously. The crosslinked sample then passes through the hot pipe 42 and is stretched by puller 44. Finally, the product is wound onto a take-up roll 46 for storage purposes. The irradiation chamber 3827 contains a UV lamp, suitably a Fryston type D lamp, which is 6" long and has a power of 1,800 watts. The UV irradiation is suitably filtered therein using a glass tube made of Vycor or Pyrex or Quartz. This filters out the radiation of shorter wavelength to help prevent overheating of the polymer as well as polymer degradation.

FIG. 3 shows the alternative process using orientation with on-line UV irradiation. The individual portions of the process are essentially the same as those described with reference to FIG. 2, and bear similar reference numerals. From puller 28, the extrudate passes directly into the UV irradiation chamber 38, through which it is pulled by second puller 40, then is subject the post-uv drawing process; finally to be wound up on the take-up roll 46. The extrudate is drawn at a low draw ratio by the differential speeds of pullers 28 and 40, so that it is irradiated under tension.

The invention is further described for illustrative purposes with reference to the following specific working examples.

SPECIFIC DESCRIPTION OF THE MOST PREFERRED EMBODIMENTS

In the examples, two different polyethylenes were used. The first was ultra high molecular weight polyethylene Hi-Zek 145M, from Mitsui Petrochemicals, which has a molecular weight of approximately one million daltons. The other polyethylene was high molecular weight high density polyethylene Dow 62020 which has a molecular weight of approximately 233,300 daltons. The UV sensitizer was benzophenone. The crosslinker was 2,4,6-triallyloxy-1,3,5-triazine or triallyl cyanurate (TAC).

EXAMPLE 1

Ultrahigh molecular weight polyethylene (Hizek 145M, Mitsui PetroChemicals) of molecular weight one million, was mixed with lubricant in the amount of 1.5 parts per 100, and subjected to a multi-stage drawing process which approximated a drawing process with dimensioning elongational strain rate G. An apparatus as illustrated diagrammatically in FIG. 2 was used. The speeds of the first and second godets were 0.3 and 2.1 meters per minute, and the speed of the puller was 4.5 meters per minute. Accordingly, the strain rate G1 was 0.5 $s^{-1}$, and the strain rate G2 was 0.0114 $s^{-1}$, with corresponding DR1 of 7 and DR2 of 2.14, the subscripts indicating the first and second drawing stages. The overall draw ratio, i.e. from the finished polymer after the two stages of draw as compared with the starting length, was 15. FIG. 1, discussed above, is a plot of G vs. DR for this two stage process showing the critical line of sample break. The applied strain rate is always chosen to be below the critical breaking stress indicated by the critical line. The oriented wire produced in this example had a tensile modulus of 10.7 GPa and a tensile strength of 540 MPa. With one stage orientation process, the maximum attainable draw ratio is 8, and the strain rate is 0.4 $S^{-1}$. Consequently, the sample had a tensile modulus of 4.5 GPa and a tensile strength of 300 MPa.

EXAMPLE 2

In this example, the same ultrahigh molecular weight polyethylene as used in Example 1 was mixed in the extruder with a UV sensitizer, benzophenone in the amount of 1.5 parts per 100, and crosslinker TAC, in the same amount. The mixture also contained lubricant in a concentration of 1.5 pph. The materials were processed as described in Example 1, using an apparatus as shown in FIG. 2. The speeds of the first and second godets were 0.3 and 2.1 meters per minute, and the speed of the puller in the drawing process was 3 meters per minute Thus, $G_1=0.05$ $s^{-1}$, $G_2=0.0043$ $s^{-1}$, $DR_1=7$ and $DR_2=1.43$, where subscripts 1 and 2 indicate drawing stages 1 and 2 respectively. The total draw ratio up to the end of the second drawing stage was 10.

The sample was irradiated by passing through irradiation chamber 38, for a time varying from 0 to 40 seconds. This was achieved by varying the speed of the pullers in the crosslinking process from 0.23 meters per minute (corresponding to 40 seconds exposure time). The draw ratio in this step ($DR_3$) was 1.05, giving an overall draw ratio through the process of 10.5. The minimum elongational strain rate in this region ($G_3$) was 0.0006 $s^{-1}$ for the 40 second exposure time and the maximum strain rate was 0.0026 $s^{-1}$ for the 3 second exposure time. The plot of G versus DR for this process is substantially identical to that shown in FIG. 1, derived from Example 1.

Figure 4:
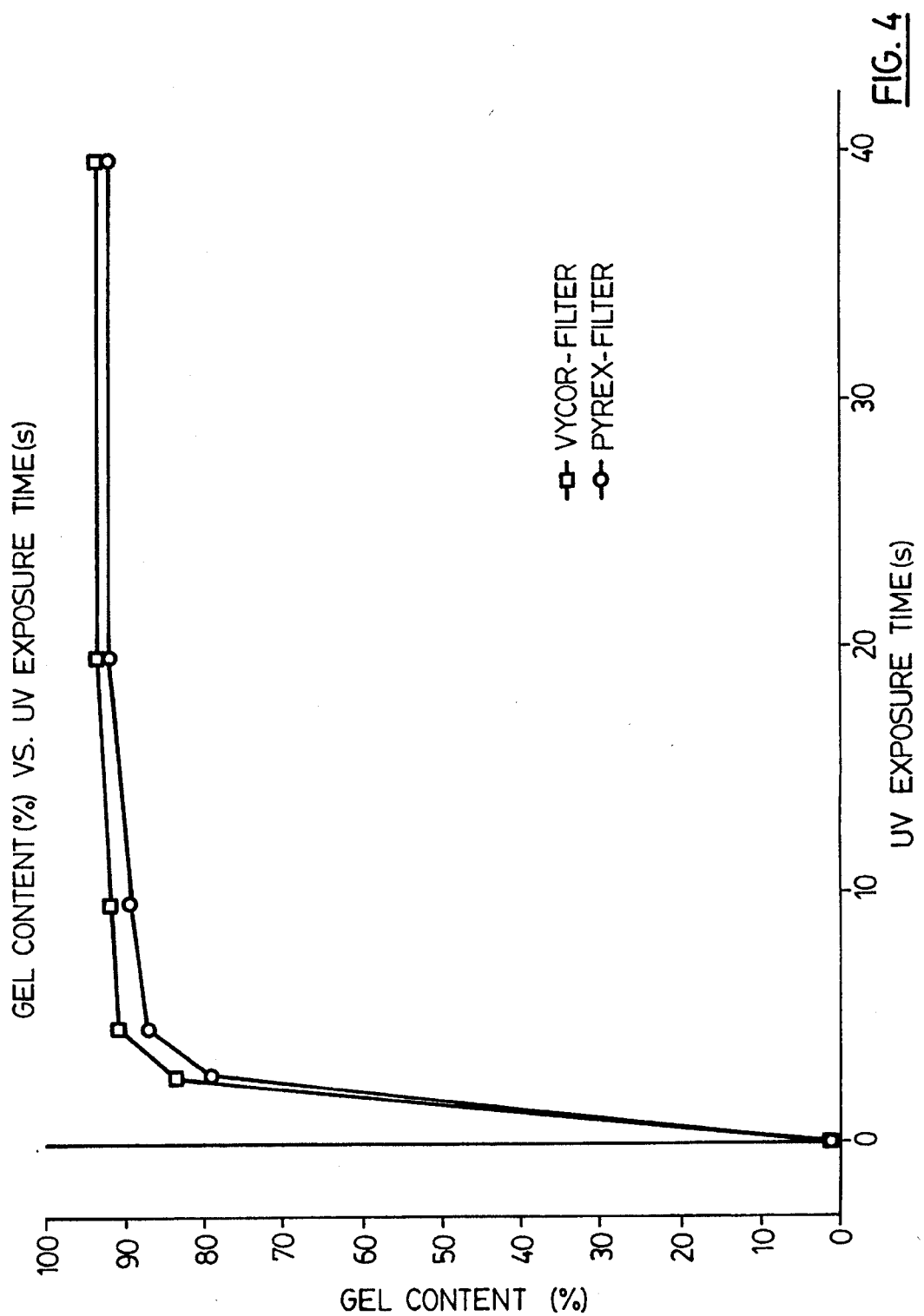
FIG. 4 is a graph of gel content of the polymer sample against time of UV crosslinking irradiation derived from Example 2 and 3 below.

The gel content of the various polymers after different times of irradiation was measured by standard procedures, and the data is summarized in Table 1 below and presented graphically in FIG. 4. The gel content increased with exposure time, reaching a limiting value after 5 seconds.

Figure 5:
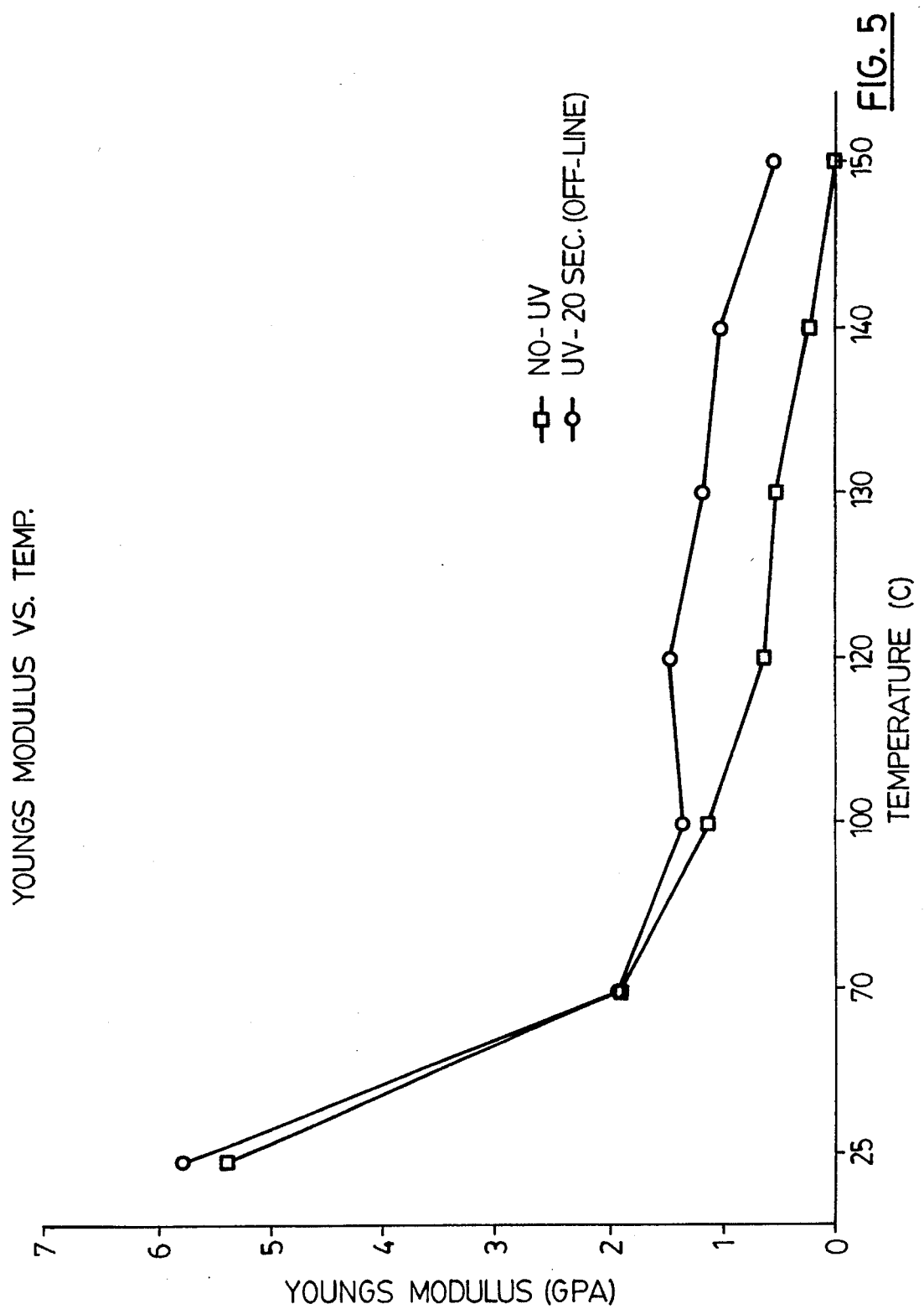
FIG. 5 is a graph of the variation in modulus with temperature, of the products from Example 2 below.
Figure 6:
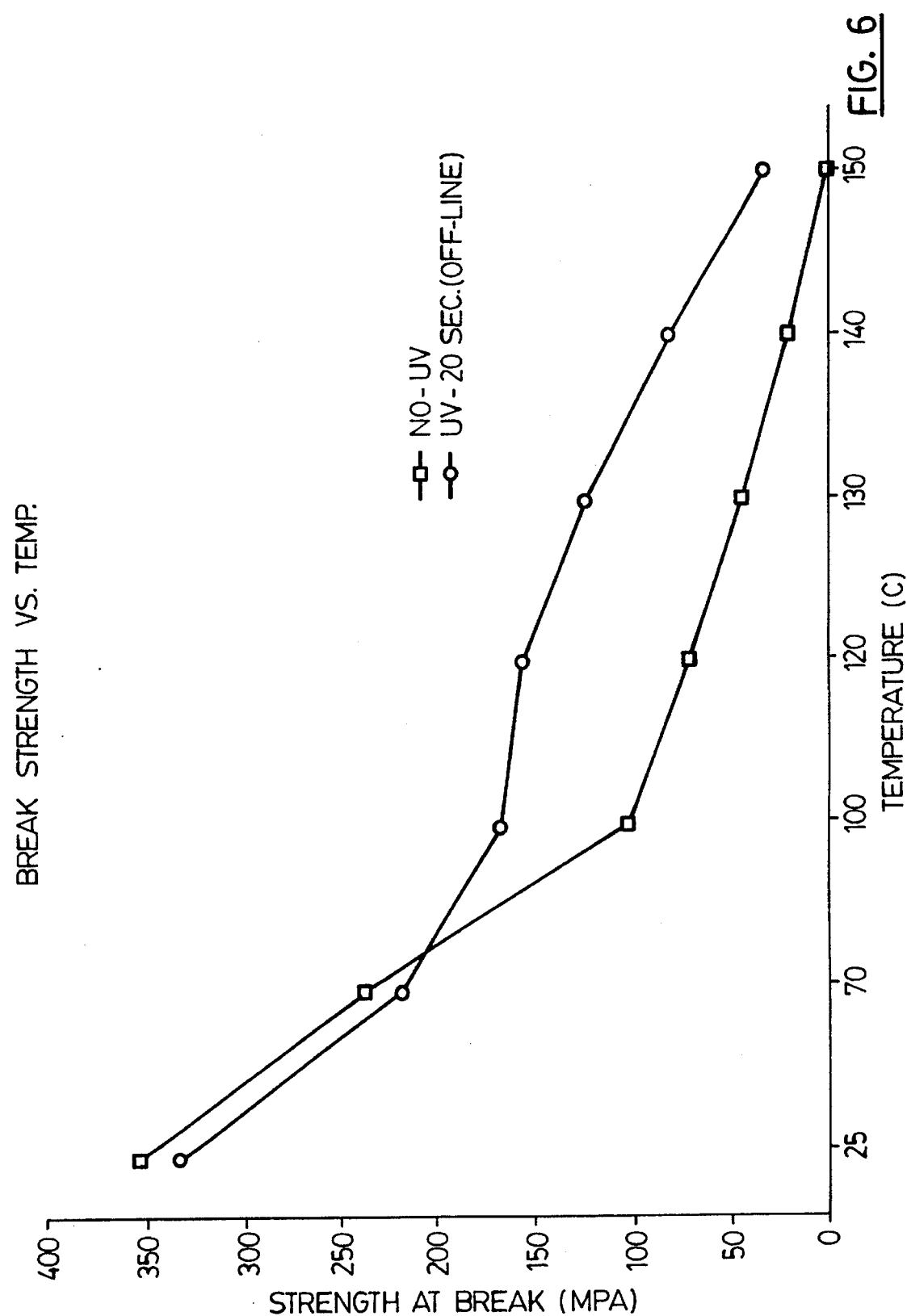
FIG. 6 is a graph of the variation of tensile strength with temperature, of the products from Example 2 below.

The tensile properties of the irradiated extruded samples, namely the tensile strength (MPa), elongation at break (%) and the Young's modulus (GPa) were measured, and are presented in Table 2 below. FIG. 5 of the accompanying drawings is a plot of Young's modulus against temperature, for an irradiated and a non-irradiated sample from this example. FIG. 6 is a similar graphical presentation of tensile break strength against temperature.

TABLE I

Gel Contents

| Exposure Time (s) | Gel Content V-Filter (%) | P-Filter (%) |
| --- | --- | --- |
| 0 | 1.20 | 1.20 |
| 3* | 83.55 | 78.85 |
| 5 | 90.90 | 87.24 |
| 10 | 91.83 | 89.32 |
| 20 | 93.42 | 92.09 |
| 40 | 93.74 | 92.19 |

*from on-line process

TABLE II

Effect on Tensile Properties

| Exposure time (s) | Chord diameter (mm) | Tensile strength (Mpa) | Elongation at break (%) | Young's modulus (GPa) |
| --- | --- | --- | --- | --- |
| 0 | 1.188 | 335.1 | 15.1 | 5.43 |
| 3* | 1.198 | 316.8 | 15.1 | 5.43 |
| 5 | 1.181 | 335.6 | 13.3 | 5.51 |
| 10 | 1.188 | 326.0 | 13.6 | 5.27 |
| 20 | 1.166 | 316.7 | 13.4 | 5.43 |
| 40 | 1.165 | 344.6 | 12.5 | 6.16 |

*from on-line process

UV irradiation was selected for crosslinking because no significant degradation (thus no deterioration of mechanical properties) was observed, along with a slight but significant increase in the modulus of the samples. These increases are attributable to the additional, third stage drawing which takes place during UV irradiation. FIGS. 5 and 6 show that whilst, in general, mechanical properties always decreased with increasing temperature, nevertheless after crosslinking (in this case for 20 seconds irradiation), the tensile strength and modulus at elevated temperatures were higher than those of non-crosslinked samples. The crosslinked samples clearly have improved heat resistance, with no significant degradation. The curves presented on FIGS. 5 and 6 are the averages of three different measurements on a single experimental sample in each case.

Figure 7:
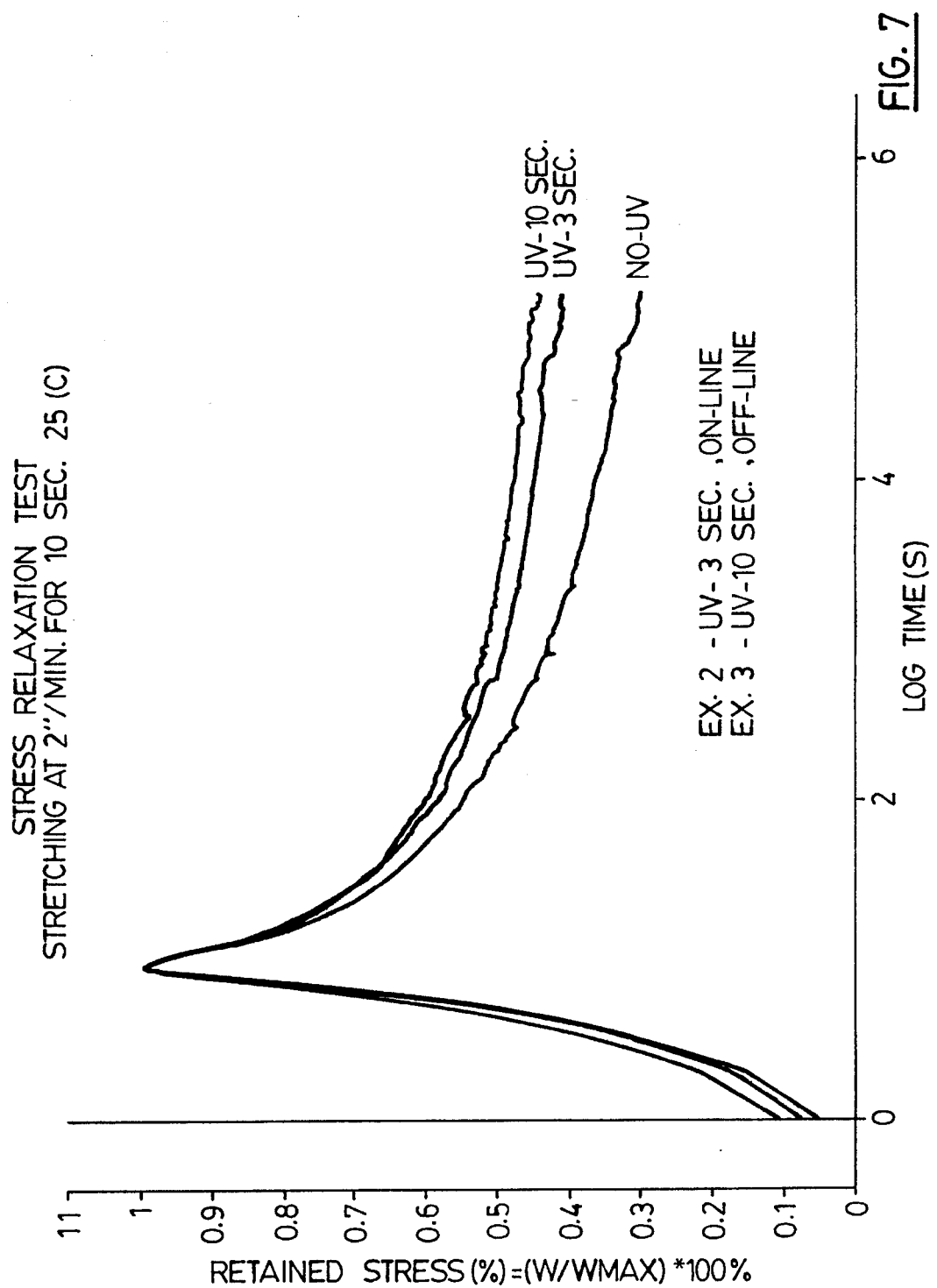
FIG. 7 shows the stress relaxation curves of the products from Example 2 and 3 below.

The effect of crosslinking on a stress relaxation properties of the oriented products are summarized in Table III and presented graphically on FIG. 7.

TABLE III

Results Of The Measurements

| Samples Time (s) | NO-UV Retained Stress (%) | UV-3* Retained Stress (%) | Seconds Improvement (%) | UV-10** Retained Stress (%) | seconds Improvement (%) |
| --- | --- | --- | --- | --- | --- |
| 100 | 53.3 | 58.1 | 5.1 | 59.7 | 8.0 |
| 1000 | 43.6 | 48.1 | 10.2 | 50.8 | 16.5 |
| 10000 | 37.1 | 43.2 | 16.2 | 48.3 | 37.1 |
| 100000 | 32.2 | 40.0 | 24.2 | 48.3 | 40.1 |

Improvement (%) = [(R.S % of NO-UV) − (R.S % of UV)] * 100% / (R.S % of NO-UV)
*On-Line
**Off-Line The stress relaxation test is conducted in an Instron test machine. There, the sample is held at a given elongation and the retained force on it is measured at intervals. The stress relaxation curves shown on FIGS. 7 are for extruded wires before and after crosslinking (10 second exposure time is produced from off-line process, while the 3 second one is from on-line process). The stress relaxation curves were obtained by measuring the retained stress with time after the wires were stretched to 8.33% strain for 10 seconds. As the figures and curves illustrate, crosslinking reduced the stress relaxation rate. The retained stress after 10,000 seconds increased from 32 to 45% of the original stress when the specimen was irradiated for 10 seconds.

Uniaxial tensile creep tests were performed at 25° C. using a extensometer and a dead loading apparatus. A constant 20 lb load was used for all samples. The initial stress was approximately 80 (MPa). The nominal stress was calculated based on the original cross sectional area. Creep strain is the ratio of change in length and the original length. Creep modulus is defined as the ratio of stress (calculated on the original cross sectional area $A_o$) to the creep strain. Creep rate is the rate of change of the strain with time, and slope $\alpha$ is defined as the rate of change of the strain with respect to the logarithmic of time. For convenience, the term slope $\alpha$ is used here to express the "creep rate". The results of creep tests are summarized in Table IV, and in FIGS. 8, 9 and 10.

TABLE IV

Creep Strain Data

| UV Time (s) | Sample Diameter (mm) | Loading Stress (Mpa) | Creep Strain (%) 1 min. | 1 hour | 1 day | 10 days |
| --- | --- | --- | --- | --- | --- | --- |
| 0 | 1.191 | 79.91 | 3.25 | 4.44 | 5.02 | 5.59 |
| 3 | 1.193 | 79.64 | 3.81 | 5.00 | 5.34 | 5.55 |
| 10 | 1.184 | 80.86 | 3.39 | 4.14 | 4.24 | 4.27 |
| 40 | 1.165 | 83.54 | 2.80 | 3.57 | 3.89 | #4.00 |

*Predicted

Figure 8:
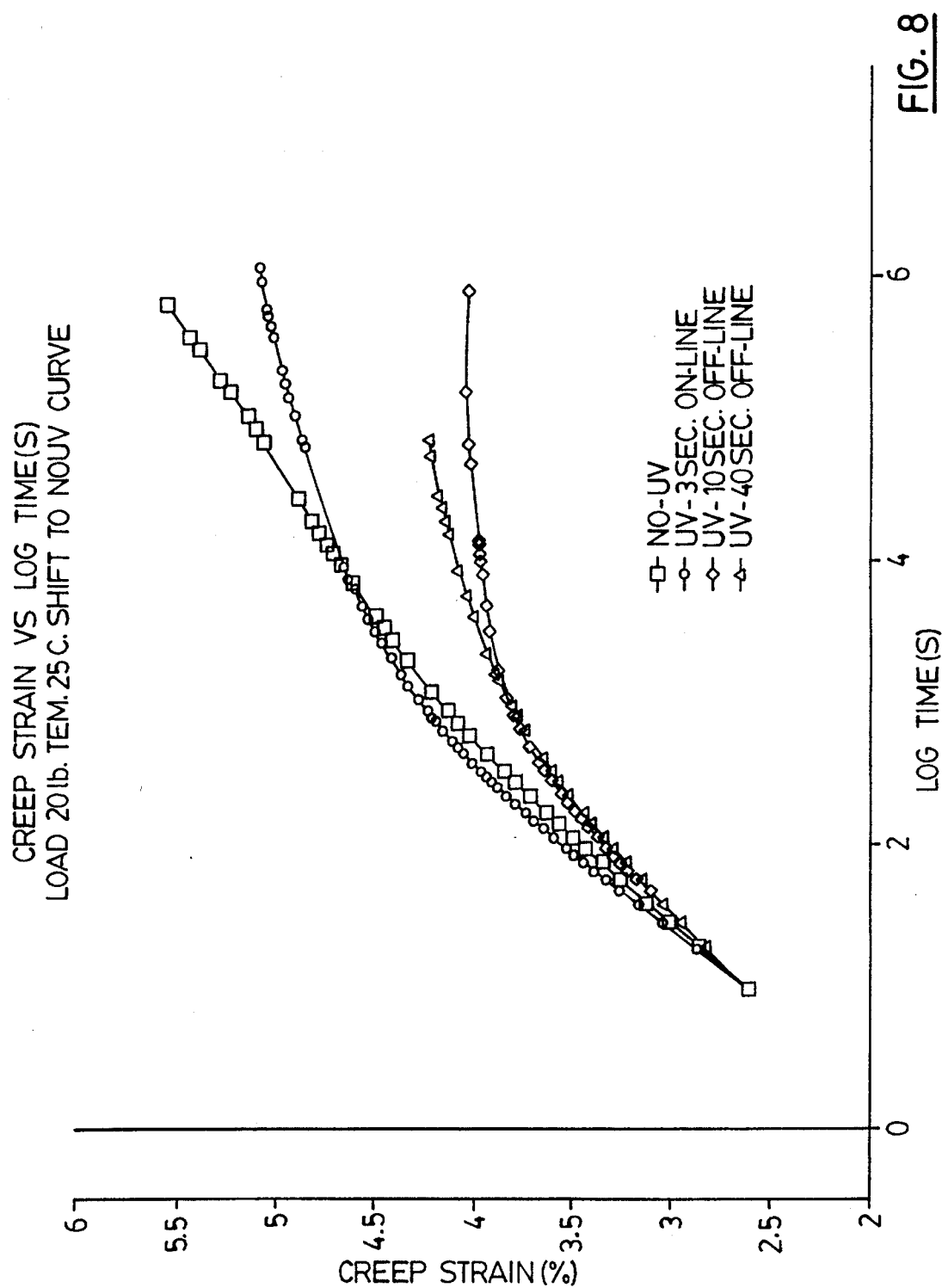
FIG. 8 shows the creep strain curves of the products from Example 2 and 3 below.

Table IV and FIG. 8 show the creep strain data for the non-irradiated and the irradiated samples (10 and 40 seconds). The creep rate of a crosslinked specimens is significantly lower than that of the uncrosslinked specimen.

Figure 9:
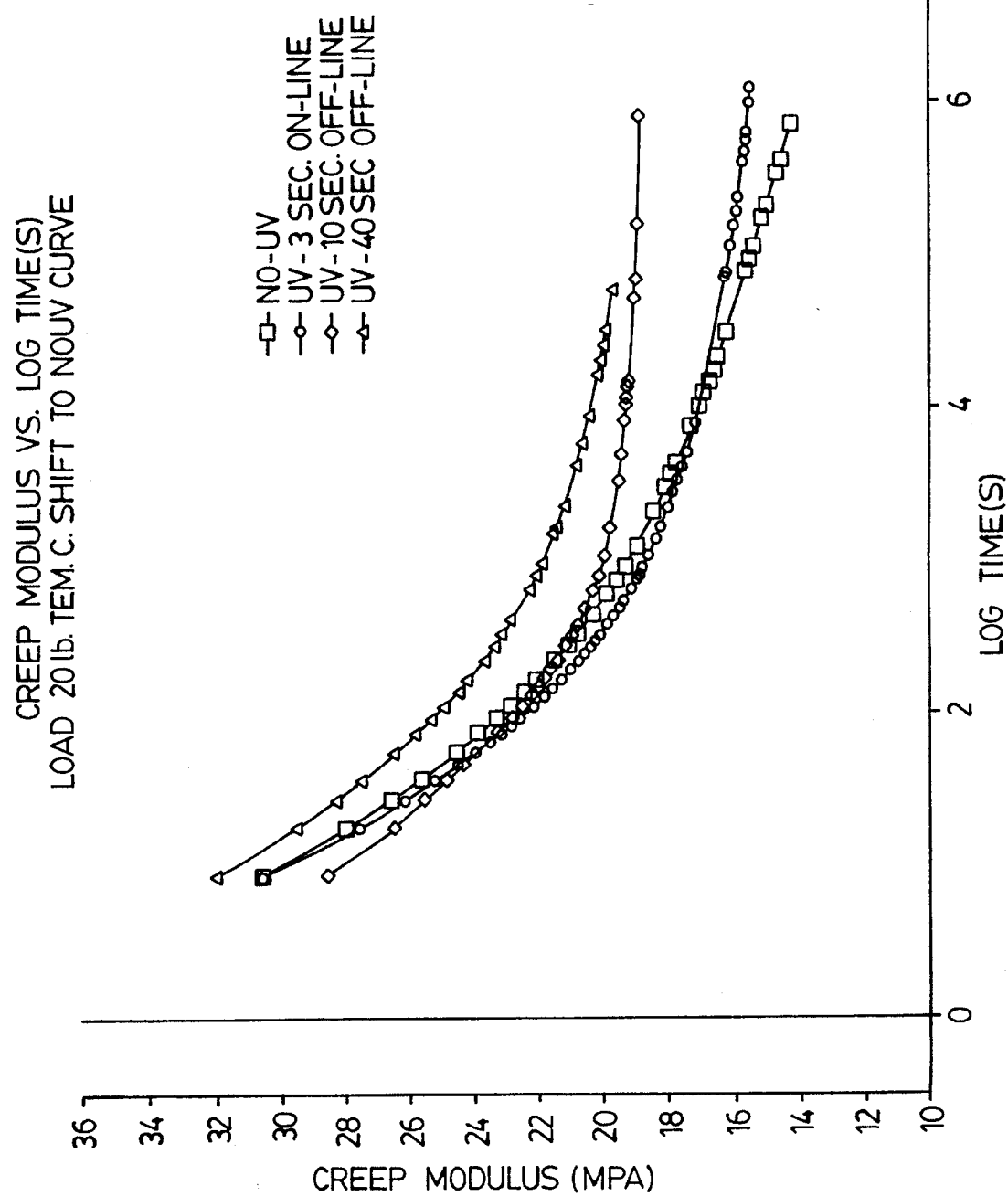
FIG. 9 is a graphical presentation of the creep modulus data of the samples from Example 2 and 3 below.

It is further important to note that the creep rate approaches 0 after 10,000 seconds. This indicates that by UV crosslink oriented sample at a lower strain rate drawing process, UV irradiation can be used to reduce the creep leading to the plateau value. Thus, very high degrees of both creep resistance and orientation are potentially obtainable using this process. Table V and FIG. 9 show the creep modulus data for both the uncrosslinked and the crosslinked specimens.

TABLE V

| UV Time (s) | Creep Modulus (Mpa) | | | | # Variation of The Creep Modulus | | | | | |
|---|---|---|---|---|---|---|---|---|---|---|
| | | | | | (1 min – 1 hr) | | (1 hr – 1 day) | | (1 day – 10 day) | |
| | 1 min. | 1 hour | 1 day | 10 days | (Mpa) | (%) | (Mpa) | (%) | (Mpa) | (%) |
| 0 | 24.55 | 18.00 | 15.91 | 14.27 | −6.55 | (−26%) | −2.09 | (−11%) | −1.64 | (−10%) |
| 3 | 20.88 | 15.96 | 15.00 | 14.32 | −4.92 | (−24%) | −0.96 | (−6%) | −0.68 | (−5%) |
| 10 | 23.89 | 19.53 | 19.00 | 18.91 | −4.36 | (−15%) | −0.53 | (−3%) | −0.09 | (0.5%) |
| 40 | 29.79 | 22.00 | 21.50 | 21.00 | −7.79 | (−26%) | −0.50 | (−2%) | −0.5 | (−2%) |

: Variation (%) [1 min. − 1 day] = {CR(1 day) − CR (1 min)} * 100 / CR (1 min)

Figure 10:
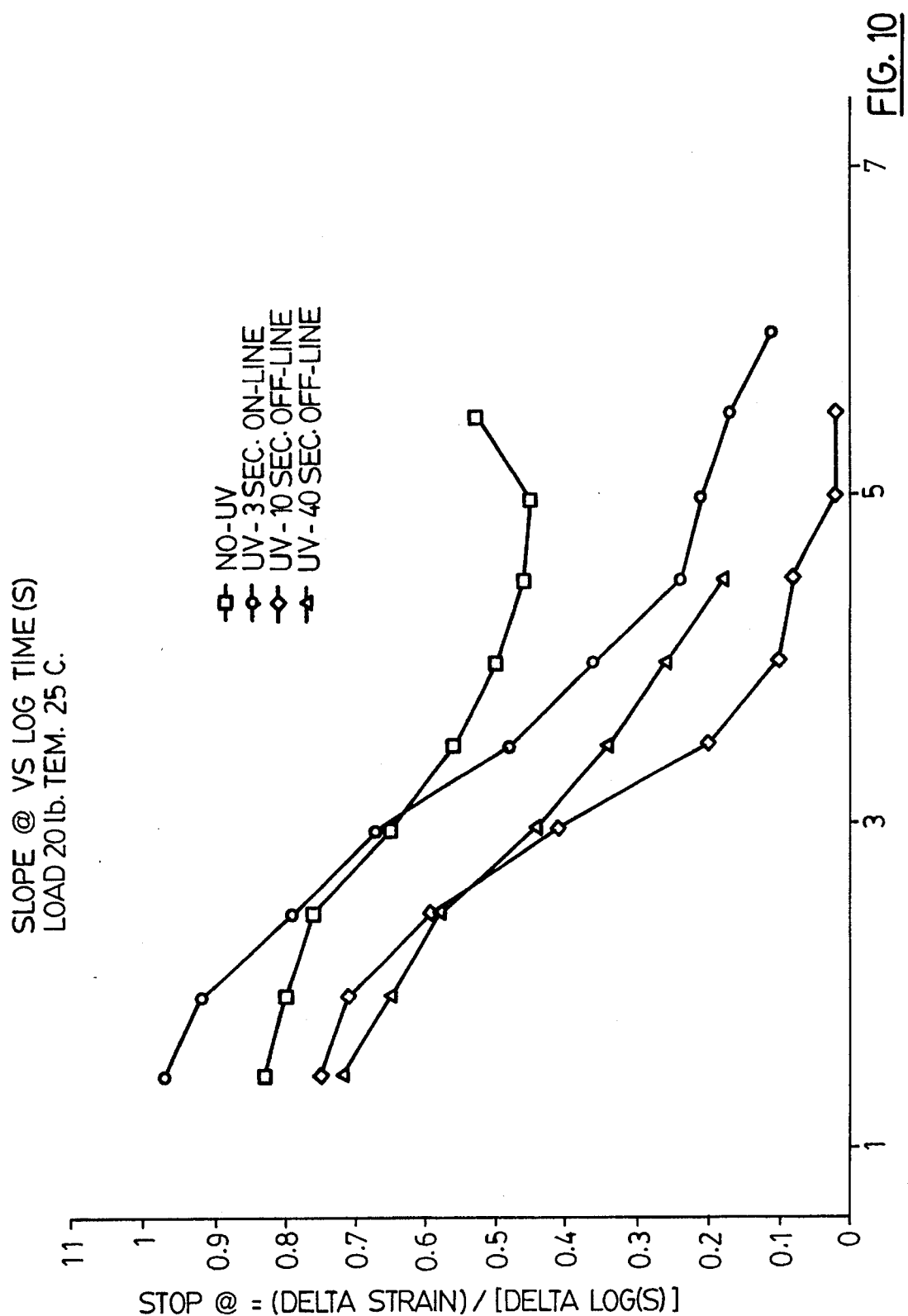
FIG. 10 is a plot of the slope of the curves of FIG. 8 as a function of time.

In general, the creep modulus decreases with time. These data show that the creep modulus of the crosslinked specimens are greater than the uncrosslinked ones. FIG. 10 shows the plot of slope α as a function of time. The slope α of the crosslinked specimens is lower and decreases more quickly than that of the uncrosslinked specimens. The slope α value of the crosslinked specimen (exposure time 10 seconds) approached 0 at 100,000 seconds. This result coincides with the observation that the creep strain reaches a limiting value after 100,000 seconds. For the uncrosslinked specimen, however, the slope α continues to keep at a high level after 100,000 seconds.

EXAMPLE 3

The experiments described in Example 2 were essentially repeated except that an apparatus configuration as diagrammatically illustrated in FIG. 3 was employed, i.e., the UV irradiation was conducted on-line during third drawing stage. The experimental conditions prior to the second drawings stage were the same as in Example 2. The third puller 10 was set at 3.15 meters per minute, which gave an irradiation time of 3 seconds.

The stress relaxation curve of this specimen is plotted together with the curves for the uncrosslinked and the off-line crosslinked (10 seconds) sample from Example 2, on FIG. 7. The retained stress of the on-line crosslinked specimen is higher than that of the crosslinked specimen, but slightly less than that of the off-line crosslinked (10 seconds) specimen. The retained stress at 100,000 seconds was 40%.

FIG. 8 shows the plot of creep strain versus time. The decrease in creep resulting from UV irradiation is not as large as that in Example 2. A longer UV irradiation chamber would be desirable to lengthen the UV exposure time.

EXAMPLE 4

This example shows the effects of concentrations of UV sensitizer and crosslinker on the degree of crosslinking in terms of the gel content.

TABLE VI

GEL content VS. BP and TAC concentration with different UV irradiation time

| TAC (%) | UV time(s) | GEL (%) | | | |
|---|---|---|---|---|---|
| | | BP 0% | BP 0.5% | BP 1.5% | BP 3.0% |
| 0 | 4 | 0 | 63.05 | 77.45 | 79.20 |
| 0 | 10 | 1.0 | 90.66 | 90.99 | 92.92 |
| 0 | 30 | 1.7 | 91.88 | 93.08 | 94.70 |

TABLE VI-continued

GEL content VS. BP and TAC concentration with different UV irradiation time

| TAC (%) | UV time(s) | GEL (%) | | | |
|---|---|---|---|---|---|
| | | BP 0% | BP 0.5% | BP 1.5% | BP 3.0% |
| 0.68 | 4 | 0.43 | 88.36 | 90.24 | 90.40 |
| 0.68 | 10 | 3.10 | 90.97 | 92.40 | 93.10 |
| 0.68 | 30 | 28.55 | 92.45 | 94.27 | 94.80 |
| 1.36 | 4 | 0.78 | 86.15 | 89.17 | 90.08 |
| 1.36 | 10 | 4.37 | 89.96 | 93.25 | 93.75 |
| 1.36 | 30 | 34.88 | 92.43 | 94.63 | 95.36 |

EXAMPLE 5

Figure 11:
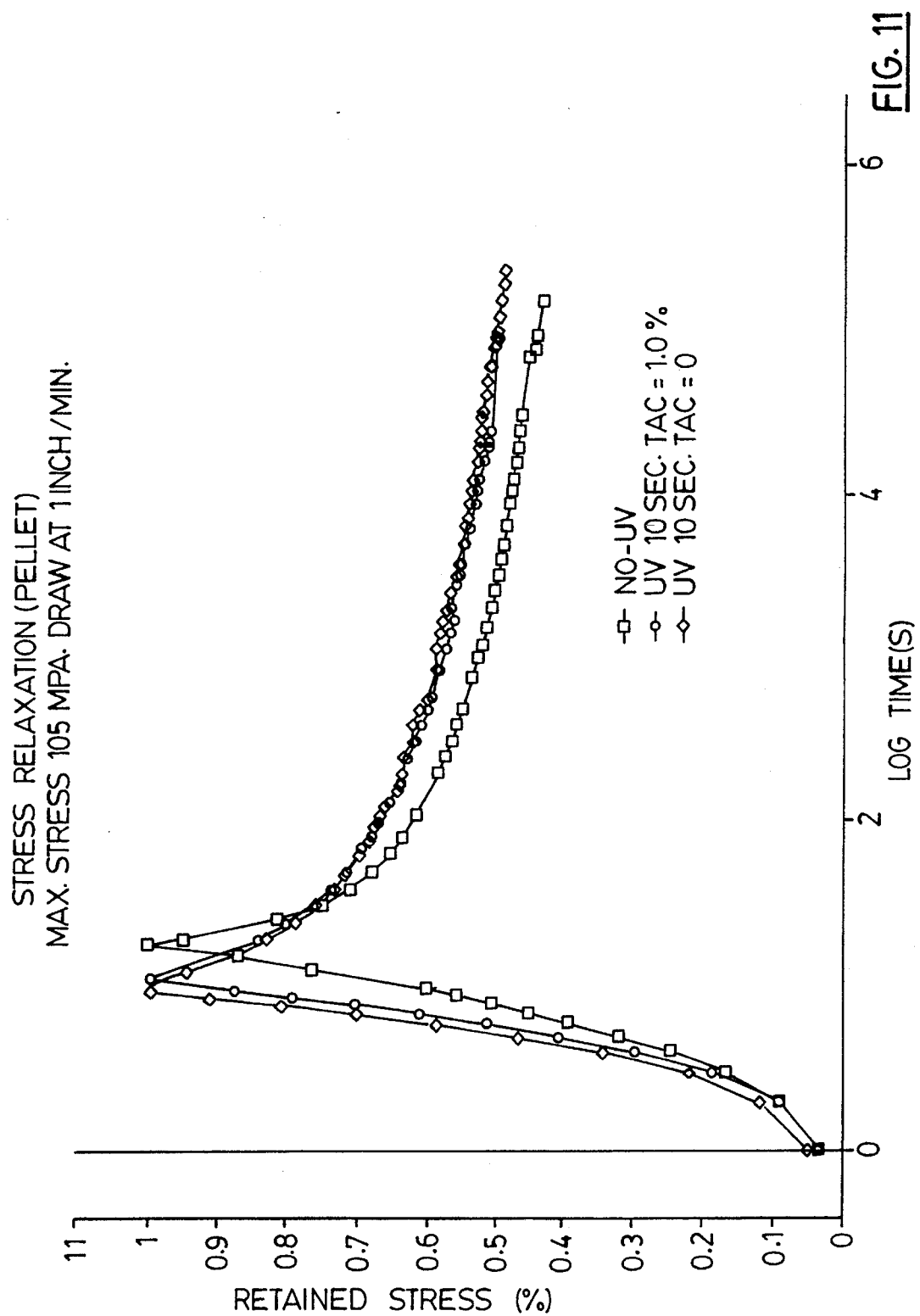
FIG. 11 is the stress relaxation curve of the products from Example 5 below.

This example shows that the process is applicable to conventional commercial polyethylene as well as to ultra high molecular weight polyethylene. FIG. 11 shows stress relaxation curves of HMWHDPE wire before and after crosslinking (10 seconds exposure time). All samples are stretched to a same stress level (100–110 MPA). Crosslinking improved the stress relaxation property: the retained stress at 10000 seconds increased from 43% to 50%. There is no significant difference between the samples with TAC and without TAC.

Table VII shows tensile properties of the HMHDPE wires before and after UV crosslinking.

TABLE VII tensile properties of HMHDPE wires

| HWHDPE sample (Dow 62020) | Wire diameter (mm) | Tensile strength (Mpa) | Elongation at break (%) | Young's modulus (Gpa) |
|---|---|---|---|---|
| NO-UV | 0.978 | 262.3 | 16.2 | 4.17 |
| UV 10 SEC.TAC = 1.0% | 0.981 | 251.9 | 10.7 | 5.18 |
| UV 10 Sec. TAC = 0 | 0.940 | 268.3 | 12.6 | 5.26 |

We claim:
1. A multi-stage process for producing high strength, highly oriented, crosslinked polyethylene products of low creep and improved thermal resistance, which comprises:
   forming a mixture of uncrosslinked polyethylene of at least 200,000 weight average molecular weight, and UV sensitizer compound capable of generating free radicals upon UV irradiation;

extruding said molten polyethylene mixture to form an extrudate thereof, and subjecting the extrudate to a first stage of elongating draw at an elongational strain rate of from about 0.03 to 0.1 $S^{-1}$ and at a draw ratio of from about 5 to 8;

subjecting the extrudate to a subsequent stage of elongating draw, at an elongational strain rate of from about 0–001 to about 0.01 $S^{-1}$ and at a draw ratio of from about 1.1 to 2.5;

and cooling the extrudate to solidify it;

wherein the extrudate, during the subsequent stage of drawing elongation is subjected to UV irradiation appropriate for the UV sensitizer to cause crosslinking of the polyethylene as the extrudate thereof undergoes said subsequent stage of drawing elongation.

2. The process of claim 1 wherein the molten polyethylene prior to extrusion is mixed with a UV crosslinker compound reactable with the UV sensitizer to generate free radicals upon UV irradiation.

3. The process of claim 2 including at least one intermediate stage of elongating draw interposed between said first stage and said subsequent stage.

4. The process of claim 2 wherein the first stage of elongating draw and the subsequent stage of elongating draw take place at temperatures from about 10° C.–40° C. above the softening point of the polyethylene.

5. The process of claim 4 wherein the polyethylene is ultrahigh molecular weight polyethylene.

6. The process of claim 5 wherein the UV sensitizer is benzophenone or a derivative thereof.

7. The process of claim 6 wherein the crosslinker is trially cyanurate.

8. The process of claim 1 wherein the polyethylene mixture also includes a lubricant.

9. The process of claim 3 wherein the extrusion, the first stage of elongating draw and an intermediate stage of elongating draw take place continuously in a first process section, and the subsequent stage of elongating draw and the UV crosslinking irradiation take place continuously in a second process section.

10. The process of claim 3 wherein the extrusion, the first stage of elongating draw, said at least one intermediate stage of elongating draw, the subsequent stage of elongation draw and the UV crosslinking irradiation, all take place successively and continuously in a single process section.

11. The process of claim 3 additionally including a step of heating and stretching the oriented, crosslinked polyethylene product subsequently to the UV crosslinking irradiation step.

* * * * *